(12) United States Patent
Sakamoto et al.

(10) Patent No.: US 6,626,583 B2
(45) Date of Patent: Sep. 30, 2003

(54) OPTICAL MULTIPLEXER/DEMULTIPLEXER MODULE AND PRODUCTION METHOD THEREFOR

(75) Inventors: Keizo Sakamoto, Kawasaki (JP); Takashi Shiotani, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 29 days.

(21) Appl. No.: 10/078,451

(22) Filed: Feb. 21, 2002

(65) Prior Publication Data
US 2003/0077044 A1 Apr. 24, 2003

(30) Foreign Application Priority Data
Oct. 19, 2001 (JP) ........................ 2001-321850

(51) Int. Cl.$^7$ ................................. G02B 6/38
(52) U.S. Cl. ........................................ 385/73
(58) Field of Search ........................ 385/73, 74, 24, 385/33, 36

(56) References Cited

U.S. PATENT DOCUMENTS

| | | | |
|---|---|---|---|
| 5,796,889 A | * | 8/1998 | Xu et al. .................. 385/24 |
| 6,023,542 A | * | 2/2000 | Pan et al. ................. 385/24 |
| 6,347,170 B1 | * | 2/2002 | Zheng ..................... 385/34 |
| 2002/0118920 A1 | * | 8/2002 | Francis et al. ............. 385/33 |
| 2003/0007713 A1 | * | 1/2003 | Dy et al. .................. 385/11 |
| 2003/0012517 A1 | * | 1/2003 | Yu et al. .................. 385/73 |
| 2003/0072527 A1 | * | 4/2003 | Li et al. .................. 385/34 |

FOREIGN PATENT DOCUMENTS

JP          11-052176     *  2/1999

* cited by examiner

*Primary Examiner*—Michael C. Zarroli
(74) *Attorney, Agent, or Firm*—Staas & Halsey LLP

(57) ABSTRACT

An optical multiplexer/demultiplexer module including a first ferrule assembly having a first sleeve and a first ferrule inserted and fixed in the first sleeve, the first ferrule having first and second optical fibers; a first element fixed to the first ferrule assembly, the first element having a first lens and a bandpass filter; and a second element fixed to the first element, the second element having a wedge plate for optical path correction, the wedge plate being formed of glass. The optical multiplexer/demultiplexer module further includes a third element fixed to the second element, the third element having a second lens; and a second ferrule assembly fixed to the third element, the second ferrule assembly having a second sleeve and a second ferrule inserted and fixed in the second sleeve, the second ferrule having a third optical fiber.

20 Claims, 11 Drawing Sheets

OPTICAL MULTIPLEXER/DEMULTIPLEXER MODULE AND PRODUCTION METHOD THEREFOR

BACKGROUND OF THE INVENTION

1. Field of the Invention

The present invention relates to an optical multiplexer/demultiplexer module and a production method therefor.

2. Description of the Related Art

The widespread use of a communication network using optical fiber transmission is essential for the construction of multimedia information society, and it is therefore necessary to realize a photodetector module for efficiently converting an optical signal into an electrical signal at a low cost. Further, wavelength division multiplex optical communication for multiplexing a plurality of optical signals having different wavelengths to transmit wavelength division multiplexed signal light by taking advantage of the wavelength dependence of light is being expected to provide various services including bidirectional communication and service multiplex, and it is therefore essential to provide an optical multiplexer/demultiplexer module for multiplexing and demultiplexing optical signals having different wavelengths.

A coaxial type optical multiplexer/demultiplexer module and a box type optical multiplexer/demultiplexer module are known in the art. The coaxial type optical multiplexer/demultiplexer module includes a cylindrical body, various optical components such as a bandpass filter and an optical isolator fixed in the cylindrical body by bonding or soldering, and input/output optical fibers welded to the opposite ends of the cylindrical body by YAG laser. The box type multiplexer/demultiplexer module includes a box, various optical components such as a bandpass filter and an optical isolator bonded or welded to the bottom surface of the box, and input/output fiber lens assemblies are welded to the side surfaces of the box after alignment. In each type optical multiplexer/demultiplexer module, the fiber and the lens in each of input and output ports must be adjusted in advance so that a collimated beam is generated. The various optical components are arranged in the optical path of the collimated beam, and fixed in the cylindrical body or at the bottom of the box by bonding or soldering.

Referring to FIG. 1, the structure of a coaxial type optical multiplexer/demultiplexer module 2 in the prior art will further be described. Reference numeral 4 denotes a cylindrical body. An input port 6 is fixed to one end of the cylindrical body 4, and an output port 8 is fixed to the other end of the cylindrical body 4. The input port 6 includes a sleeve 16, a lens holder 12 inserted and fixed in the sleeve 16, a spherical lens 14 press-fitted in the lens holder 12, and a ferrule 10 inserted and fixed in the lens holder 12. The sleeve 16 is spot-welded to one end of the cylindrical body 4.

The output port 8 includes a sleeve 24, a lens holder 22 inserted and fixed in the sleeve 24, a spherical lens 20 press-fitted in the lens holder 22; and a ferrule 18 inserted and fixed in the lens holder 22. A semispherical block 26 is fixed to the other end of the cylindrical body 4, and the output port 8 is welded to the semispherical block 26 after alignment. Various optical components 28, 30, 32, and 34 such as a bandpass filter and an optical isolator are accommodated in the cylindrical body 4.

In view of the properties of the optical components used in the optical multiplexer/demultiplexer module, it is essential to ensure optical coupling by a collimated beam and suppress optical path deviation. In the coaxial type optical multiplexer/demultiplexer module 2 as shown in FIG. 1, however, the deviation of an optical path occurs because of a difference in refractive index and thickness among the various optical components 28, 30, 32, and 34. Reference numeral 36 denotes the optical path thus deviated.

The coaxial type optical multiplexer/demultiplexer module in the prior art has the following problems.

(1) It is difficult to correct the optical path deviation because of a limited narrow space.

(2) It is difficult to connect the multiple optical components in tandem because of the occurrence of the optical path deviation. In particular, the angle of incidence on the module is large in the case of using a two-core ferrule, so that the output port must be largely adjusted in angle, resulting in that the output port largely projects from the outer diameter of the cylindrical body.

(3) The workability is low because the optical components are mounted into the cylindrical body.

(4) In the case of using a method of fixing the optical components inserted in the cylindrical body by through welding, the tolerance becomes close to cause an increase in parts cost.

On the other hand, the box type optical multiplexer/demultiplexer module in the prior art has the following problems.

(1) It is difficult to reduce the size.

(2) The box is a member formed by cutting, so that the parts cost is high.

(3) The workability in fixing the optical components and in alignment is low.

Further, in the case of adjusting the angle of emergence of output light from the output port, the output light is monitored by an infrared camera or the like, and the infrared camera is moved along the optical axis of the module to calculate the emergent angle of the output light from the amount of movement of the camera and the deviation of an image obtained by the camera. However, this method can make accurate measurement only in the case of a collimated beam. In the conventional method, it is necessary to measure convergent light passed through the lens, so that accurate measurement and adjustment are impossible. Further, in adjusting the lens, the measurement is required at two or more points as moving the camera, causing an increase in adjustment time.

SUMMARY OF THE INVENTION

It is therefore an object of the present invention to provide an optical multiplexer/demultiplexer module which can correct the deviation of an optical path occurring in combining a plurality of elements in tandem.

It is another object of the present invention to provide a production method for such an optical multiplexer/demultiplexer module improved in productivity.

In accordance with an aspect of the present invention, there is provided an optical multiplexer/demultiplexer module comprising a first ferrule assembly having a first sleeve and a first ferrule inserted and fixed in the first sleeve, the first ferrule having first and second optical fibers; a first element fixed to the first ferrule assembly, the first element having a first lens and a first bandpass filter; a second element fixed to the first element, the second element having a wedge plate for optical path correction, the wedge plate being formed of a material transparent to the wavelength of light to be used; a third element fixed to the second element, the third element having a second lens; and a second ferrule assembly fixed to the third element, the second ferrule assembly having a second sleeve and a second ferrule inserted and fixed in the second sleeve, the second ferrule having a third optical fiber.

Preferably, the optical multiplexer/demultiplexer module further includes a fourth element interposed between the first element and the third element, the fourth element having a second bandpass filter. Preferably, the wedge plate has a first flat surface and a second flat surface opposite to the first flat surface, the second flat surface being inclined with respect to the normal to the optical axis of the module by a given angle. The direction of inclination of the second flat surface of the wedge plate coincides with the direction of extension of a plane defined by the first and second optical fibers of the first ferrule. Preferably, the first lens includes an aspherical lens, and the wedge plate is formed of glass. Each of the first and second bandpass filters includes a glass plate and a dielectric multilayer film formed on the glass plate.

In accordance with another aspect of the present invention, there is provided a production method for an optical multiplexer/demultiplexer module, comprising the steps of preparing a first element having a first lens, a first bandpass filter, and a marker; preparing a second element having a wedge plate for optical path correction and a marker, the wedge plate being formed of a material transparent to the wavelength of light to be used and having a flat surface inclined with respect to the normal to the optical axis of the module by a given angle; fixing the second element to the first element after alignment of the markers of the first and second elements; preparing a first ferrule assembly having a first sleeve and a first ferrule inserted and fixed in, the first-sleeve, the first ferrule having first and second optical fibers; fixing the first ferrule assembly to the first element after aligning the first ferrule assembly so that the direction of inclination of the flat surface of the wedge plate coincides with the direction of extension of a plane defined by the first and second optical fibers; preparing a third element having a second lens; fixing the third element to the second element after aligning the third element to the second element; preparing a second ferrule assembly having a second sleeve and a second ferrule inserted and fixed in the second sleeve, the second ferrule having a third optical fiber; and fixing the second ferrule assembly to the third element.

Preferably, the production method further includes the steps of preparing a fourth element having a second bandpass filter and a fourth marker; and fixing the fourth element to the second element after alignment of the second and fourth markers.

The above and other objects, features and advantages of the present invention and the manner of realizing them will become more apparent, and the invention itself will best be understood from a study of the following description and appended claims with reference to the attached drawings showing some preferred embodiments of the invention.

FIG, 10 is a perspective view of another assembly unit; and

Figure 11:
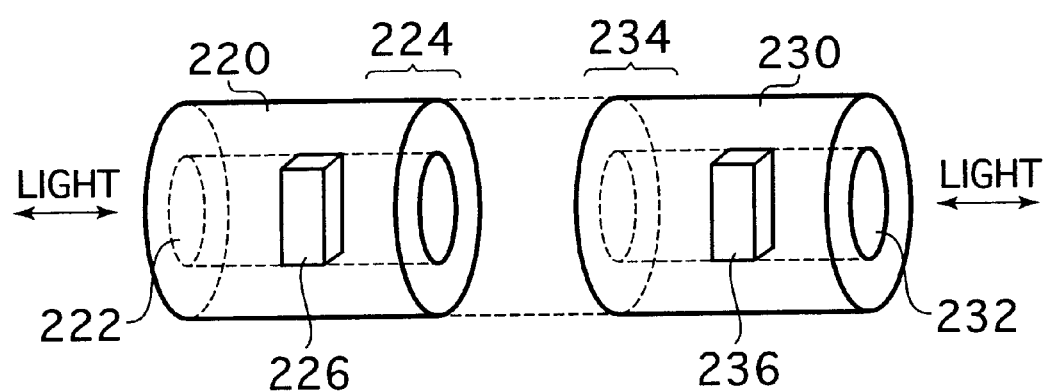

FIG. 11 is a schematic view showing an example to which the principle of the present invention is applied.

DETAILED DESCRIPTION OF THE PREFERRED EMBODIMENTS

Figure 1:
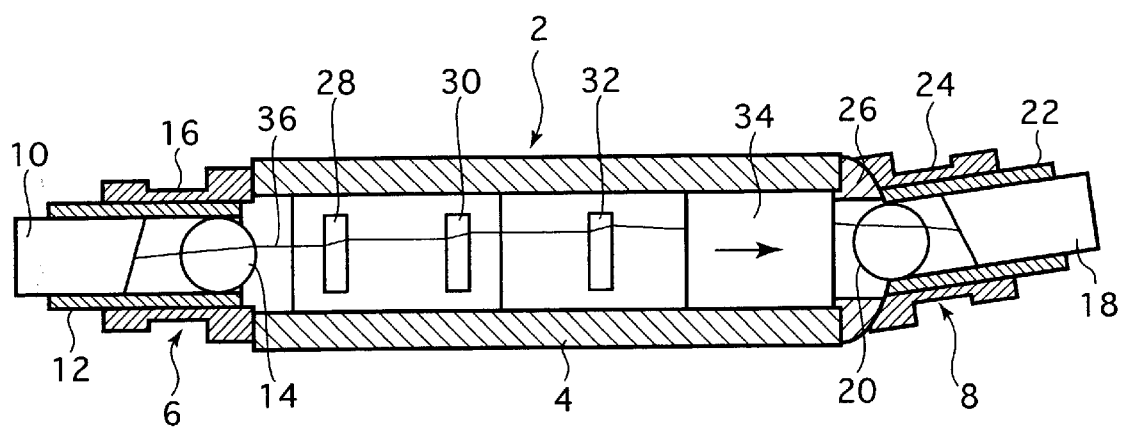
FIG. 1 is a sectional view for illustrating the problems in, the conventional structure.
Figure 2A:
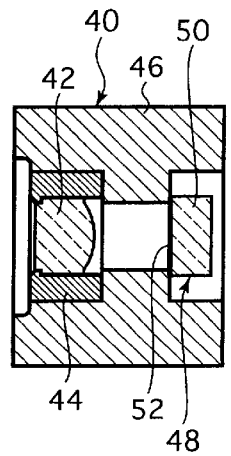
FIG. 2A is a sectional view of a first element.

FIGS. 2A to 2E are schematic sectional views of various elements constituting the optical multiplexer/demultiplexer module according to the present invention. FIG. 2A shows a first element 40 having an aspherical lens 42 and a bandpass filter 48. The aspherical lens 42 is fixed in a lens holder 44 by press fit. The lens holder 44 is fixed in a cylindrical sleeve 46 by spot welding or bonding. The bandpass filter 48 is composed of a glass plate 50 and a dielectric multilayer film 52 formed on one surface of the glass plate 50. The bandpass filter 48 is fixed in the cylindrical sleeve 46 by bonding. The cylindrical sleeve 46 has an alignment marker.

Figure 2B:
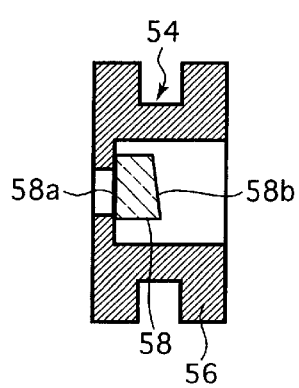
FIG. 2B is a sectional view of a second element.

FIG. 2B shows a second element 54 having a wedge plate 58 for optical path correction. The wedge plate 58 is formed of a material transparent to the wavelength of light to be used. Preferably, the wedge plate 58 is formed of glass. The wedge plate 58 has a first flat surface 58a and a second flat surface 58b inclined to the first flat surface 58a by a given angle (e.g., 8°). The first and second flat surfaces 58a and 58b are covered with an antireflection coating. The wedge plate 58 is inserted in a cylindrical sleeve 56 and fixed therein by bonding. The cylindrical sleeve 56 has an alignment marker.

Figure 2C:
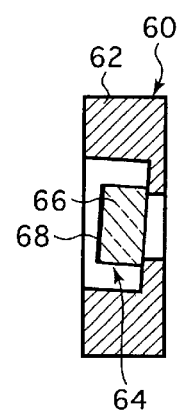
FIG. 2C is a sectional view of a fourth element.

FIG. 2C shows a fourth element 60 having a bandpass filter 64. The bandpass filter 64 is composed of a glass plate 66 and a dielectric multilayer film 68 formed on the glass plate 66. The passband of the bandpass filter 64 is substantially the same as that of the bandpass filter 48 of the first element 40 shown in FIG. 2A. The bandpass filter 64 is inserted in a cylindrical sleeve 62 so as to be inclined by a given angle (e.g., 4° to the normal to the optical axis of the fourth element 60, and fixed in the cylindrical sleeve 62 by bonding. The cylindrical sleeve 62 has an alignment marker.

Figure 2D:
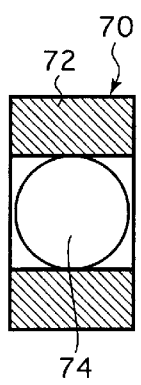
FIG. 2D is a sectional view of a third element.
Figure 2E:
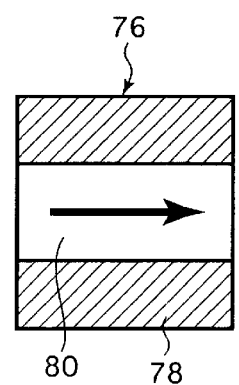
FIG. 2E is a sectional view of a sixth element.

FIG. 2D shows a third element 70 having a spherical lens 74. The spherical lens 74 is press-fitted in a cylindrical sleeve 72. FIG. 2E shows a sixth element 76 having an optical isolator 80. The optical isolator 80 is accommodated in a cylindrical sleeve 78. The cylindrical sleeve 78 has an alignment marker. All of the cylindrical sleeves 46, 56, 62, 72, and 78 are formed of stainless steel.

Figure 3:
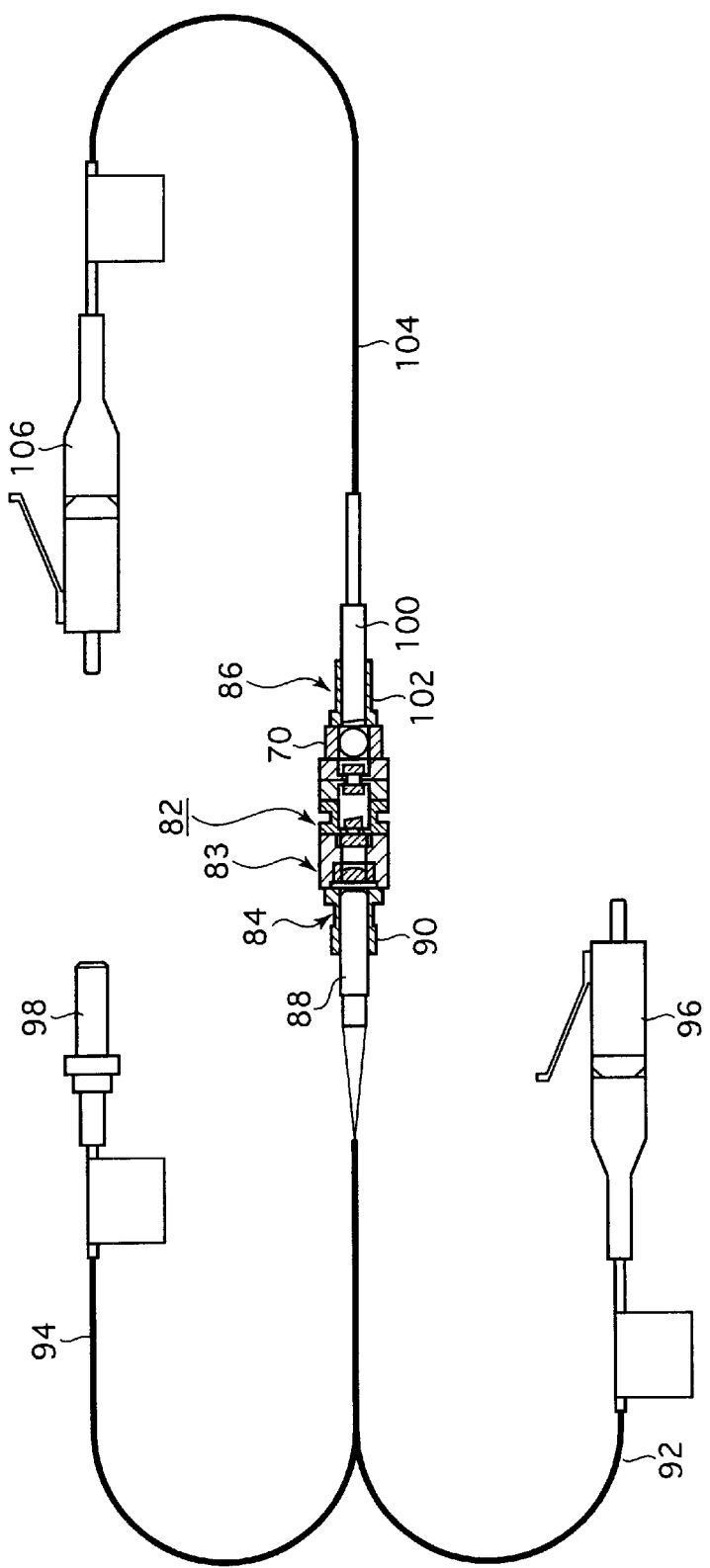
FIG. 3 is a partially sectional, plan view of an optical multiplexer/demultiplexer module according to a first preferred embodiment of the present invention.
Figure 4:
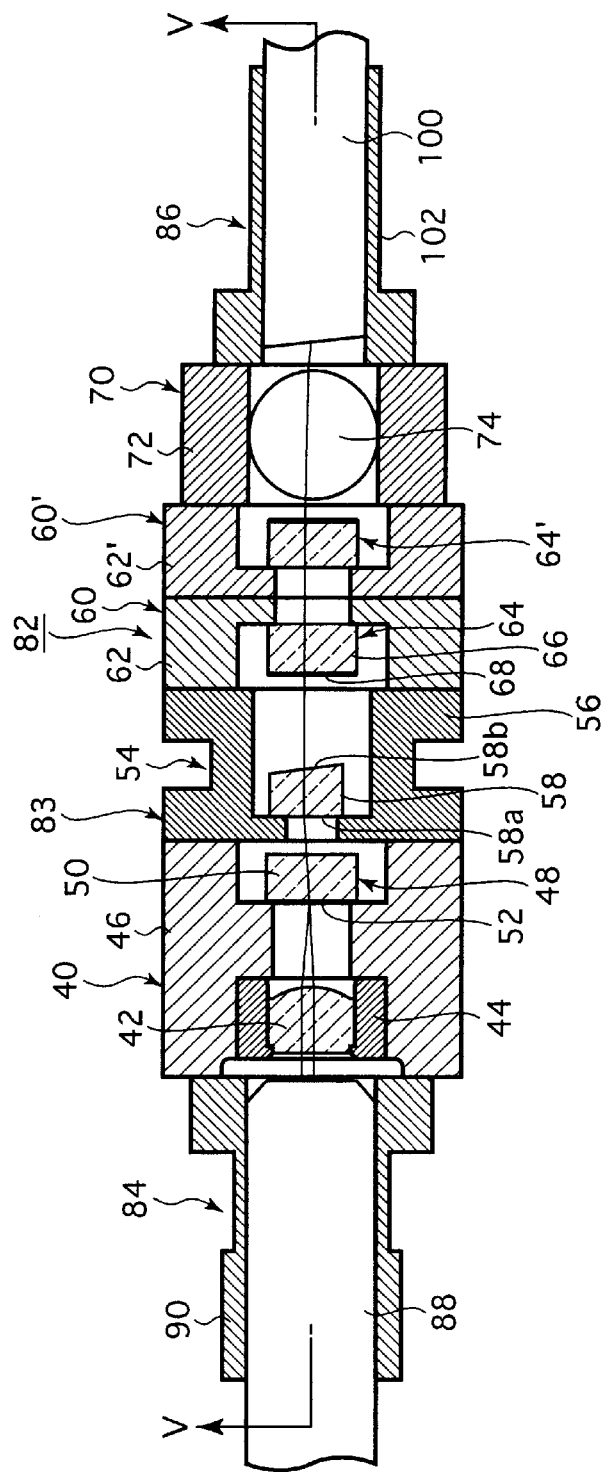
FIG. 4 is an enlarged sectional view of the optical multiplexer/demultiplexer module according to the first preferred embodiment.
Figure 5:
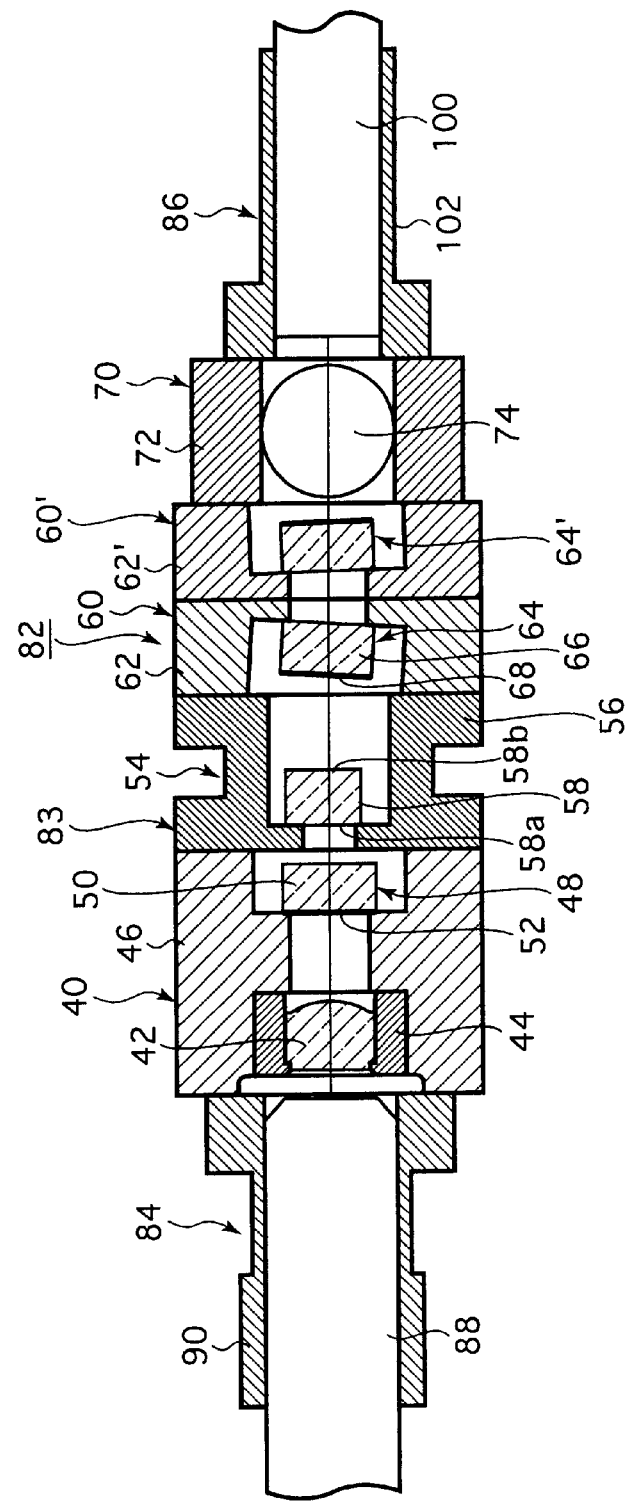
FIG. 5 is a cross section taken along the line V—V in FIG. 4.

FIG. 3 is a partially sectional, plan view of an optical multiplexer/demultiplexer module 82 according to a first preferred embodiment of the present invention. FIG. 4 is an enlarged sectional view of the optical multiplexer/demultiplexer module 82, and FIG. 5 is a, cross section taken along the line V—V in FIG. 4. Referring to FIG. 3, the optical multiplexer/demultiplexer module 82 includes a cylindrical body 83, a first ferrule assembly 84 as an input port fixed to one end of the cylindrical body 83, the third element 70 (shown in FIG. 2D) fixed to the other end of the cylindrical body 83, and a second ferrule assembly 86 as an output port fixed to the third element 70.

The first ferrule assembly 84 includes a sleeve 90 and a two-core ferrule 88 inserted and fixed in the sleeve 90. Two optical fibers 92 and 94 are inserted, and fixed at their first ends in the two-core ferrule 88 in such a manner as to be spaced from each other by 0.25 mm. The optical fiber 92 is connected at its second end to an optical connector 96, and the optical fiber 94 is connected at its second end to a ferrule 98. The optical fibers 92 and 94 fixed in the two-core ferrule 88 are bare fibers obtained by stripping off the coatings of the optical fibers 92 and 94. The second ferrule assembly 86 includes a sleeve 102 and a ferrule 100 inserted and fixed in the sleeve 102. An optical fiber 104 is inserted and fixed at its first end in the ferrule 100 in the condition of a bare fiber. The optical fiber 104 is connected at its second end to an optical connector 106.

The structure of the optical multiplexer/demultiplexer module 82 according to the first preferred embodiment will now be described in more detail with reference to FIGS. 4 and 5. The cylindrical body 83 of the optical multiplexer/demultiplexer module 82 includes the first element 40 shown in FIG. 2A, the second element 54 shown in FIG. 2B, the fourth element 60 shown in FIG. 2C, and a fifth element 60' similar to the fourth element 60. Like the fourth element 60, the fifth element 60' is composed of a cylindrical sleeve 62' and a bandpass filter 64' inserted and fixed in the cylindrical sleeve 62'. As shown in FIG. 5, the bandpass filter 64' is inclined in a direction opposite to the direction of inclination of the bandpass filter 64 of the fourth element 60 by the same inclination angle. The cylindrical sleeve 62' also has an alignment marker. All of the elements 40, 54, 60, and 60' are assembled together by aligning the markers of the cylindrical sleeves 46, 56, 62, and 62' and next spot-welding the cylindrical sleeves 46, 56, 62, and 62' by YAG laser, for example. As shown in FIG. 4, the direction of inclination of the second flat surface 58b of the wedge plate 58 coincides with the direction of extension of a plane defined by the two optical fibers 92 and 94 fixed in the two-core ferrule 88.

The operation of the optical multiplexer/demultiplexer module 82 according to the first preferred embodiment will now be described. Signal light having a wavelength of 1528 nm and servo light having a wavelength of 1520 nm are emerged from the optical connector 96. The signal light and the servo light from the optical connector 96 propagate in the optical fiber 92 and are input through the first ferrule assembly 84 into the first element 40. The signal light and the servo light input are collimated by the aspherical lens 42 of the first element 40 to enter the bandpass filter 48. Only the servo light having the wavelength of 1520 nm is transmitted by the dielectric multilayer film 52 of the bandpass filter 48, and the signal light having the wavelength of 1528 nm is reflected by the dielectric multilayer, film 52 of the bandpass filter 48. The signal light reflected is coupled to the first end of the optical fiber 94, and propagates in the optical fiber 94 to emerge from the ferrule 98.

The optical path of the servo light transmitted through the bandpass filter 48 is deviated from the optical axis of the module 82. However, the servo light from the first element 40 is refracted by the wedge plate 58 of the second element 54, so that the optical path of the servo light is corrected to become substantially parallel to the optical axis. The servo light passed through the second element 54 is transmitted by the bandpass filter 64 of the fourth element 60 and the bandpass filter 64' of the fifth element 60'. As mentioned above, the bandpass filters 64 and 64' are fixed in the cylindrical sleeves 62 and 62', respectively, so as to be inclined in the opposite directions with respect to the normal to the optical axis by the same angle. Accordingly, the optical path of the servo light transmitted through the bandpass filter 64' becomes substantially parallel to the optical axis of the module 82.

The servo light passed through the fifth element 60' is coupled to the first end of the optical fiber 104 of the second ferrule assembly 86 by the spherical lens 74 of the third element 70, and propagates in the optical fiber 104 to emerge from the optical connector 106. In the optical multiplexer/demultiplexer module 82 according to this preferred embodiment, all of the elements 40, 54, 60, and 60' have the same outer diameter, so that the cylindrical body 83 can be easily assembled by simply aligning the markers of the respective cylindrical sleeves without awareness of the optical axis.

The optical multiplexer/demultiplexer module 82 is assembled by the following method. First, the elements 40, 54, 60, and 60' are assembled to prepare the cylindrical body 83. The first ferrule assembly 84 is next fixed to one end of the cylindrical body 83 (the left end as viewed in FIG. 4) by laser spot welding after performing alignment in the X, Y, and Z directions. Thereafter, alignment on the output side is performed. That is, the third element 70 is aligned to the cylindrical body 83 in the X and Y directions, and next fixed to the other end of the cylindrical body 83 (the right end as viewed in FIG. 4) by laser spot welding. Similarly, the second ferrule assembly 86 is next fixed to the third element 70 by laser spot welding after performing alignment in the X, Y, and Z directions.

The angle of emergence of the servo light from the spherical lens 74 is adjusted to a specified angle, for example, by using a far field pattern (FFP) optical system and an infrared camera to measure the emergent angle. According to this preferred embodiment, the second element 54 having the wedge plate 58 is inserted in the optical path, so that the optical path of the transmitted light from the bandpass filter 48 is less deviated from the optical axis, thereby allowing the provision of a compact optical multiplexer/demultiplexer module.

Figure 6:
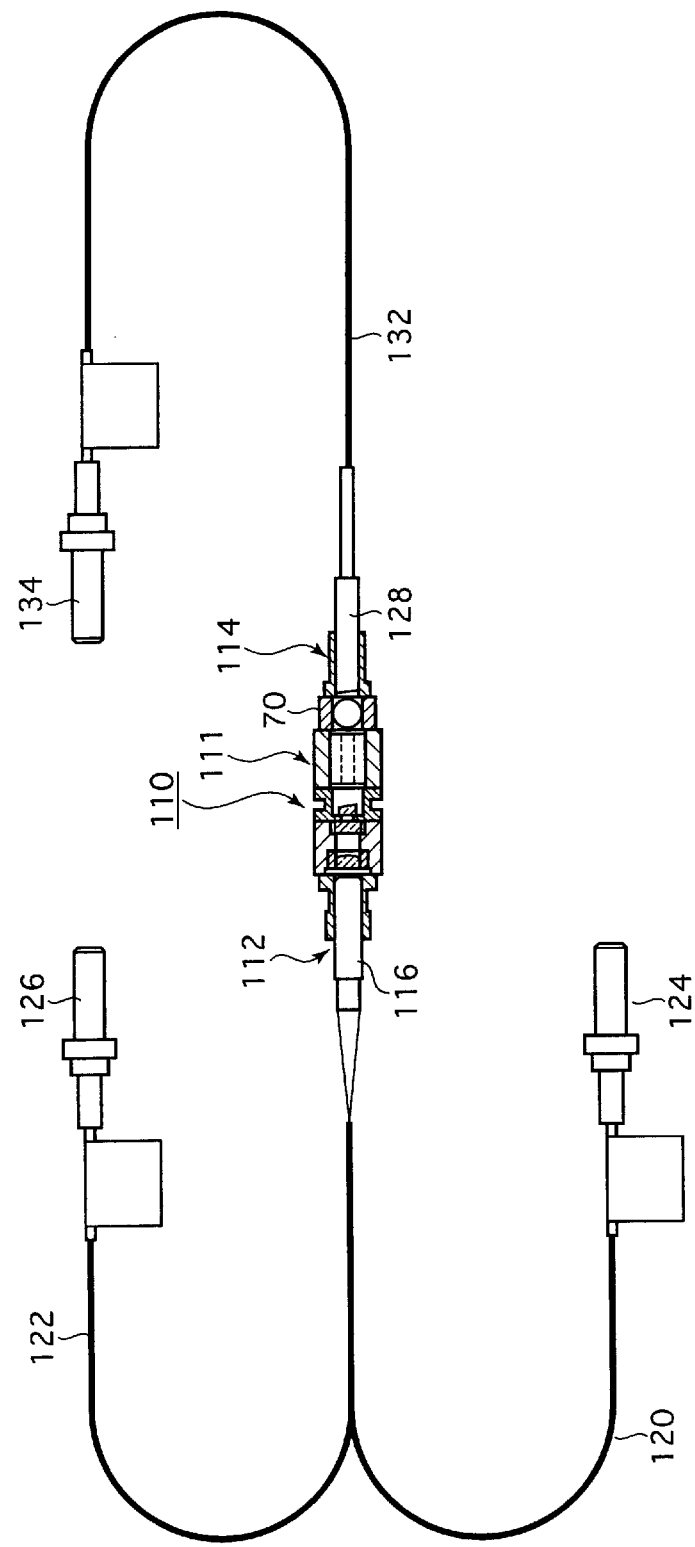
FIG. 6 is a partially sectional, plan view of an optical multiplexer/demultiplexer module according to a second preferred embodiment of the present invention.

Referring to FIG. 6, there is shown a partially sectional, plan view of an optical multiplexer/demultiplexer module 110 according to a second preferred embodiment of the present invention. The optical multiplexer/demultiplexer module 110 includes a cylindrical body 111, a first ferrule assembly 112 as an input port fixed to one end of the cylindrical body 111, the third element 70 (shown in FIG. 2D) fixed to the other end of the cylindrical body 111, and a second ferrule assembly 114 as an output port fixed to the third element 70.

The first ferrule assembly 112 includes a sleeve 118 and a two-core ferrule 116 inserted and fixed in the sleeve 118. Two optical fibers 120 and 122 are inserted and fixed at their first ends in the two-core ferrule 116 in the condition of bare fibers. The optical fibers 120 and 122 are connected at their second ends to ferrules 124 and 126, respectively. The second ferrule assembly 114 includes a sleeve 130 and a ferrule 128 inserted and fixed in the sleeve 130. An optical fiber 132 is inserted and fixed at its first end in the ferrule 128 in the condition of a bare fiber. The optical fiber 132 is connected at its second end to a ferrule 134.

Figure 7:
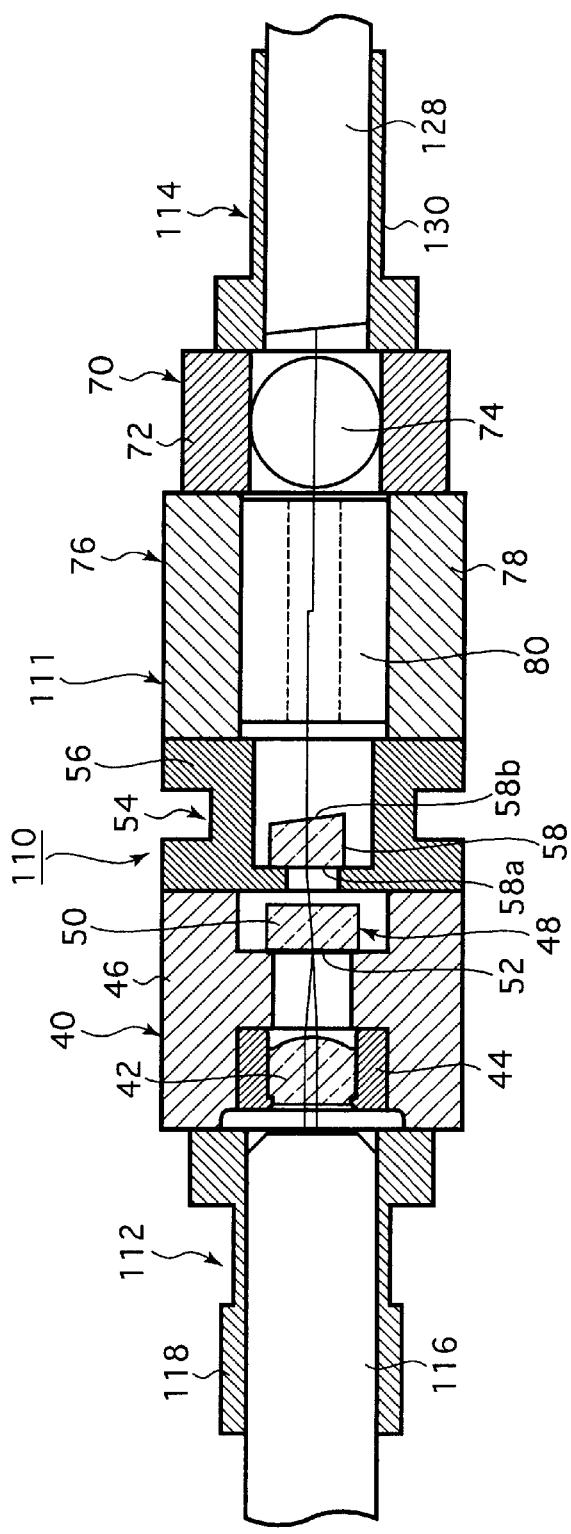
FIG. 7 is an enlarged sectional view of the optical multiplexer/demultiplexer module according to the second preferred embodiment.

Referring to FIG. 7, the cylindrical body 111 of the optical multiplexer/demultiplexer module 110 includes the first element 40 shown in FIG. 2A, the second element 54 shown in FIG. 2B, and the sixth element 76 shown in FIG. 2E. As in the first preferred embodiment, all of the elements 40, 54, and 76 constituting the cylindrical body 111 have the same outer diameter. Accordingly, the cylindrical body 111 can be easily assembled by simply aligning the markers of the respective cylindrical sleeves without awareness of the optical axis. The first ferrule assembly 112, the third element 70, and the second ferrule assembly 114 are mounted to the cylindrical body 111 in a manner similar to that of the first preferred embodiment.

The operation of the second preferred embodiment will now be described. Signal light having a wavelength, of 1528 nm is emerged from the ferrule 124. The signal, light propagates in the optical fiber 120 to enter the first element 40 through the first ferrule assembly 112. The signal light is next transmitted through the bandpass filter 48. The optical path of the signal light is next corrected by the wedge plate 58 of the second element 54, and the signal light is next transmitted through the optical isolator 80 of the sixth element 76. Thereafter, the signal light is coupled to the first end of the optical fiber 132 of the second ferrule assembly 114 by the spherical lens 74 of the third element 70. The signal light thus entered the optical fiber 132 propagates in the optical fiber 132 to emerge from the ferrule 134.

On the other hand, pump light having a wavelength of 1495 nm is emerged from the ferrule 126. The pump light propagates in the optical fiber 122 to enter the first element 40 through the first ferrule assembly 112. The pump light is next collimated by the aspherical lens 42, and reflected by the dielectric multilayer film 52 of the bandpass filter 48. The pump light thus reflected is coupled to the first end of the optical fiber 120, and propagates in the optical fiber 120 to emerge from the ferrule 124. Although not especially shown, the ferrule 124 is connected to an erbium doped fiber (EDF), and signal light having a wavelength of 1528 nm is amplified in the EDF.

Figure 8:
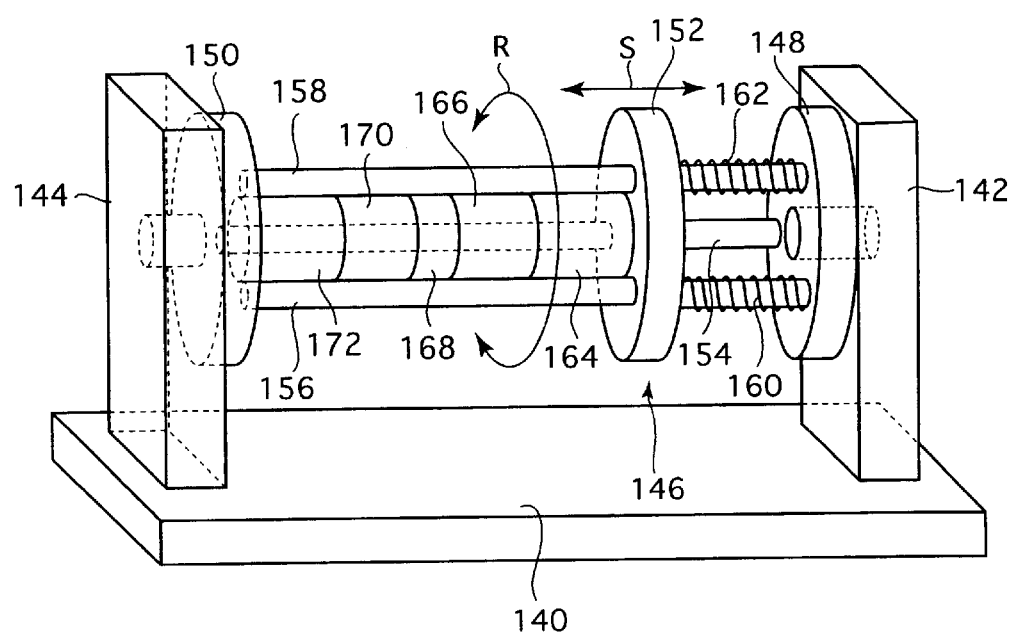
FIG. 8 is a perspective view of an assembly unit for a cylindrical body.

Referring next to FIG. 8, there is shown a perspective view of an assembly unit for assembling the cylindrical body 83 in the first preferred embodiment or the cylindrical body 111 in the second preferred embodiment. A pair of support plates 142 and 144 are fixedly mounted on a base 140. A rotary mechanism 146 is supported between the support plates 142 and 144. The rotary mechanism 146 includes a disc 148 rotatably supported to the support plate 142, a disc 150 rotatably supported to the support plate 144, and a disc 152 interposed between the discs 148 and 150. These discs 148, 150, and 152 are connected together by three parallel rods 154, 156, and 158. Springs 160 and 162 are interposed between the discs 148 and 152. The disc 152 is movable in the opposite directions as shown by the double-headed arrow S as being guided by the rods 154, 156, and 158 inserted therethrough. The assembly of the discs 148, 150, and 152 and the rods 154, 156, and 158 is rotatable in the opposite directions as shown by the double-headed arrow R.

Figure 9:
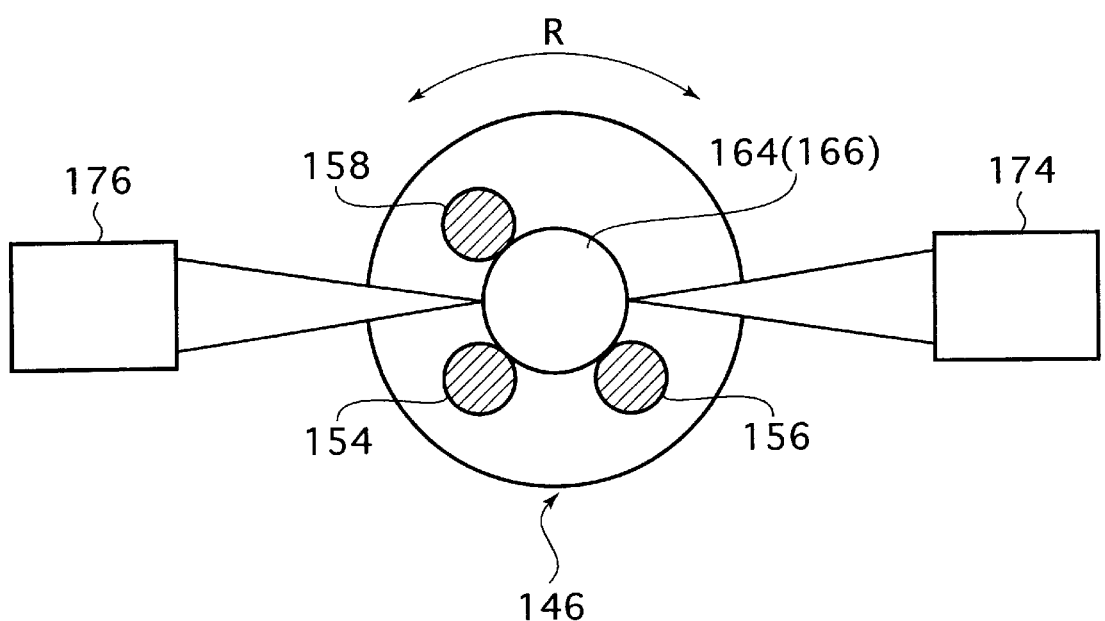
FIG. 9 is a sectional view of the assembly unit shown in FIG. 8.

As shown in FIG. 9, the rods 156 and 158 are circumferentially spaced 180° and radially spaced a distance equal to the outer diameter of the cylindrical body 83 or 111. Accordingly, a plurality of elements 164, 166, 168, 170, and 172 constituting each cylindrical body are inserted between the rods 156 and 158 and axially stacked as shown in FIG. 8. In this condition, the markers formed on all of the elements 164, 166, 168, 170, and 172 are aligned and spot-welded by YAG laser with two welding heads 174 and 176 shown in FIG. 9. The spot welding can be easily performed owing to the rotary mechanism 146.

Figure 10:
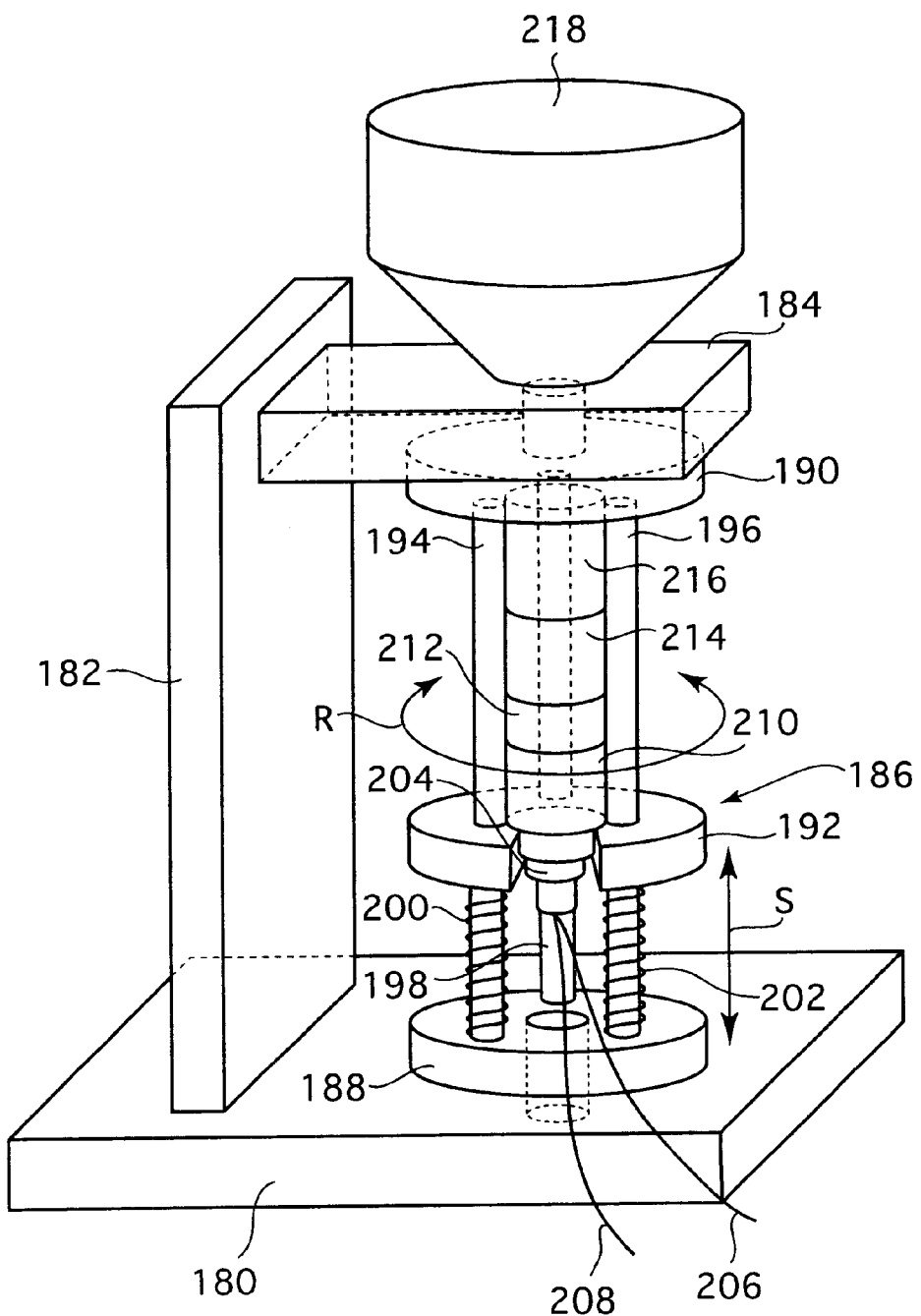

Referring to FIG. 10, there is shown a perspective view of another assembly unit. This assembly unit can correct the emergent angle of each element separately. A support plate 182 is fixedly mounted on a base 180, and a bracket 184 is fixed to the support plate 182. Reference numeral 186 denotes a rotary mechanism. The rotary mechanism 186 includes a disc 188 rotatably supported to the base 180, a disc 190 rotatably supported to the bracket 184, and a disc 192 interposed between the discs 188 and 190.

These discs 188, 190, and 192 are connected together by three parallel rods 194, 196, and 198. Springs 200 and 202 are interposed between the discs 188 and 192. The disc 192 is movable in the opposite directions as shown by the double-headed arrow as being guided by the rods 194, 196, and 198 inserted therethrough. The assembly of the discs 188, 190, and 192 and the rods 194, 196, and 198 is rotatable in the opposite directions as shown by the double-headed arrow R. A far field pattern (FFP) optical system 218 is provided above the bracket 184. Although not especially shown, an infrared camera for measuring the emergent angle of light is provided above the FFP optical system 218.

A ferrule assembly 204 as an input port is connected to two optical fibers 206 and 208. In the case that the emergent angles from the individual elements need to be corrected separately, the ferrule assembly 204 is fixed to a first element 210, and the first element 210 is then inserted among the three rods 194, 196, and 198. Thereafter, a second element 212 is similarly inserted, and light is input from one of the optical fibers 206 and 208. During the input of the light, the emergent angle from the second element 212 is measured by the FFP optical system 218 and the infrared camera to adjust the emergent angle to a specified angle. Thereafter, the second element 212 is fixed to the first element 210 by spot welding using a YAG laser. Similarly, the emergent angles from other elements 214 and 216 are corrected and next fixed together in a stacked condition as shown in FIG. 10.

FIG. 11 is a schematic view showing an example to which the principle of the present invention is applied. Reference numeral 220 denotes an optical module having a first hole 222 for inputting and outputting light, a hollow cylindrical, first connecting portion 224 having a given outer diameter and an axial hole, and an optical component 226 provided in an optical path extending through the first hole 222 and the axial hole of the first connecting portion 224. Reference numeral 230 denotes another optical module for connection to the optical module 220. The optical module 230 includes a hollow cylindrical, second connecting portion 234 having the same outer diameter as that of the first connecting portion 224 and having an axial hole, a second hole 232 for inputting and outputting light, and an optical component 236 for optical path connection provided in an optical path extending through the second hole 232 and the axial hole of the second connecting portion 234.

The second connecting portion 234 is adapted to be connected to the first connecting portion 224. The second hole 232 is a hole formed through the bottom surface of the second connecting portion 234. Thus, the optical module 230 is cylindrical as a whole as having the above given outer diameter. The optical modules 220 and 230 are connected by aligning the first connecting portion 224 and the second connecting portion 234 and fixing them by spot welding using a YAG laser, for example. In such an optical module assembly obtained by connecting the optical modules 220 and 230, the optical component 236 for optical path correction is provided in the optical module 230, so that the optical path extending through the first and second holes 222 and 232 is prevented from being largely deviated from the optical axis.

With the above configuration of the optical multiplexer/demultiplexer module according to the present invention, the following effects can be obtained.

(1) It is possible to provide a compact, multifunctional optical multiplexer/demultiplexer module.

(2) By the use of the element having the wedge plate, the deviation of an optical path occurring in combining the multiple elements in tandem can be corrected.

(3) By separating the lens and the ferrule assembly, optical axis correction and optical path correction can be made.

(4) By stacking the multiple elements in tandem to construct a subassembly, the productivity of the optical multiplexer/demultiplexer module can be improved.

(5) By separately designing the individual elements in advance and selectively using the elements to assemble them, the function can be changed to allow desired product designs according to applications.

The present invention is not limited to the details of the above described preferred embodiments. The scope of the invention is defined by the appended claims and all changes and modifications as fall within the equivalence of the scope of the claims are therefore to be embraced by the invention.

What is claimed is:

1. An optical multiplexer/demultiplexer module comprising:
   a first ferrule assembly having a first sleeve and a first ferrule inserted and fixed in said first sleeve, said first ferrule having first and second optical fibers;
   a first element fixed to said first ferrule assembly, said first element having a first lens and a first bandpass filter;
   a second element fixed to said first element, said second element having a wedge plate for optical path correction, said wedge plate being formed of a material transparent to the wavelength of light to be used;
   a third element fixed to said second element, said third element having a second lens; and
   a second ferrule assembly fixed to said third element, said second ferrule assembly having a second sleeve and a second ferrule inserted and fixed in said second sleeve, said second ferrule having a third optical fiber.

2. An optical multiplexer/demultiplexer module according to claim 1, further comprising a fourth element interposed between said first element and said third element, said fourth element having a second bandpass filter.

3. An optical multiplexer/demultiplexer module according to claim 2, further comprising a fifth element fixed to said fourth element, said fifth element having a third bandpass filter.

4. An optical multiplexer/demultiplexer module according to claim 1, wherein said wedge plate has a first flat surface and a second flat surface opposite to said first flat surface, said second flat surface being inclined with respect to the normal to the optical axis of said module by a given angle.

5. An optical multiplexer/demultiplexer module according to claim 4, wherein the direction of inclination of said second flat surface of said wedge plate coincides with the direction of extension of a plane defined by said first and second optical fibers of said first ferrule.

6. An optical multiplexer/demultiplexer module according to claim 3, wherein said second bandpass filter of said fourth element is inclined with respect to the normal to the optical axis of said module by a given angle in a given direction, and said third bandpass filter of said fifth element is inclined with respect to the normal to the optical axis of said module by said given angle in a direction opposite to said given direction.

7. An optical multiplexer/demultiplexer module according to claim 1, further comprising a sixth element interposed between said first element and said third element, said sixth element having an optical isolator.

8. An optical multiplexer/demultiplexer module according to claim 1, wherein said first lens comprises an aspherical lens.

9. An optical multiplexer/demultiplexer module according to claim 1, wherein said first bandpass filter comprises a glass plate and a dielectric multilayer film formed on said glass plate.

10. An optical multiplexer/demultiplexer module according to claim 3, wherein each of said second and third bandpass filters comprises a glass plate and a dielectric multilayer film formed on said glass plate.

11. An optical multiplexer/demultiplexer module according to claim 1, wherein said wedge plate is formed of glass.

12. A production method for an optical multiplexer/demultiplexer module, comprising the steps of:
    preparing a first element having a first lens, a first bandpass filter, and a marker;
    preparing a second element having a wedge plate for optical path correction and a marker, said wedge plate being formed of a material transparent to the wavelength of light to be used and having a flat surface inclined with respect to the normal to the optical axis of said module by a given angle;
    fixing said second element to said first element after alignment of said markers of said first and second elements;
    preparing a first ferrule assembly having a first sleeve and a first ferrule inserted and fixed in said first sleeve, said first ferrule having first and second optical fibers;
    fixing said first ferrule assembly to said first element after aligning said first ferrule assembly so that the direction of inclination of said flat surface of said wedge plate coincides with the direction of extension of a plane defined by said first and second optical fibers;
    preparing a third element having a second lens;
    fixing said third element to said second element after aligning said third element to said second element;
    preparing a second ferrule assembly having a second sleeve and a second ferrule inserted and fixed in said second sleeve, said second ferrule having a third optical fiber; and
    fixing said second ferrule assembly to said third element.

13. A production method according to claim 12, further comprising the steps of:
    preparing a fourth element having a second bandpass filter and a marker; and
    fixing said fourth element to said second element after alignment of said markers of said second and fourth elements.

14. A production method according to claim 13, further comprising the steps of:

preparing a fifth element having a third bandpass filter and a marker; and fixing said fifth element to said fourth element after alignment of said markers of said fourth and fifth elements.

15. A production method according to claim 14, wherein said second bandpass filter of said fourth element is inclined with respect to the normal to the optical axis of said module by a given angle in a given direction, and said third bandpass filter of said fifth element is inclined with respect to the normal to the optical axis of said module by said given angle in a direction opposite to said given direction.

16. A production method according to claim 12, further comprising the steps of:

preparing a sixth element having an optical isolator and a marker; and fixing said sixth element to said second element after alignment of said markers of said second and sixth elements.

17. An optical connector module for connection with an optical module having a first hole for inputting and outputting light, a first cylindrical connecting portion having a given outer diameter and an axial hole, and an optical component provided in an optical path extending through said first hole and said axial hole of said first cylindrical connecting portion, said optical connector module comprising:

a second cylindrical connecting portion having said given outer diameter and an axial hole, said second cylindrical portion being adapted to be connected to said first cylindrical connecting portion;

a second hole for inputting and outputting light; and an optical path correcting optical component provided in an optical path extending through said second hole and said axial hole of said second cylindrical connecting portion.

18. An optical connector module according to claim 17, wherein said second hole comprises a hole formed through a bottom surface of said second cylindrical connecting portion.

19. An optical connector module according to claim 17, wherein said optical connector module is cylindrical as a whole as having said given outer diameter.

20. An assembly of an optical module and an optical connector module according to claim 17, wherein said first cylindrical connecting portion and said second cylindrical connecting portion are connected together by welding.

* * * * *